Figure 1:
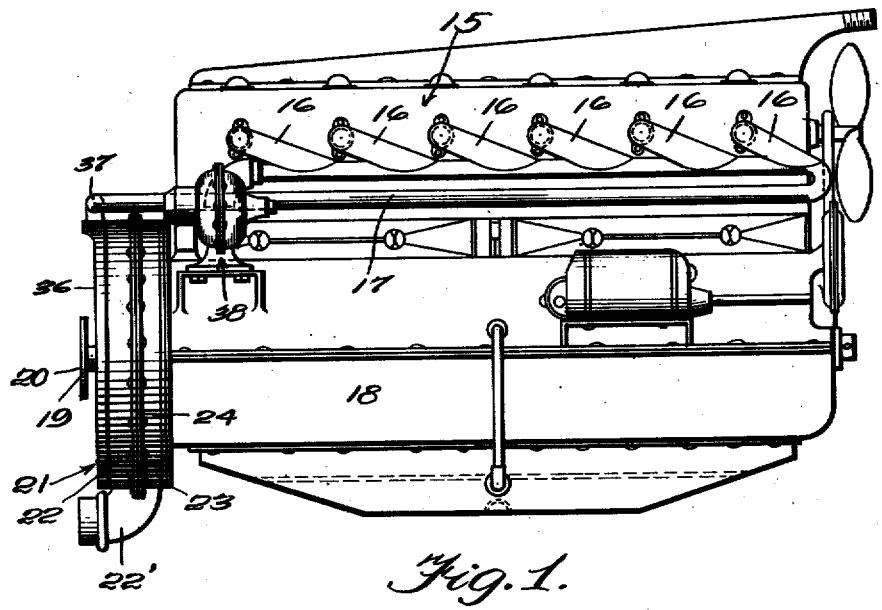

W. W. McELRATH, Jr.
INTERNAL COMBUSTION ENGINE.
APPLICATION FILED SEPT. 7, 1917.

1,319,100.

Patented Oct. 21, 1919.
3 SHEETS—SHEET 1.

Witness
J. M. Lyles

Inventor
William W. McElrath, Jr.

By Norman T. Whitaker
Attorney

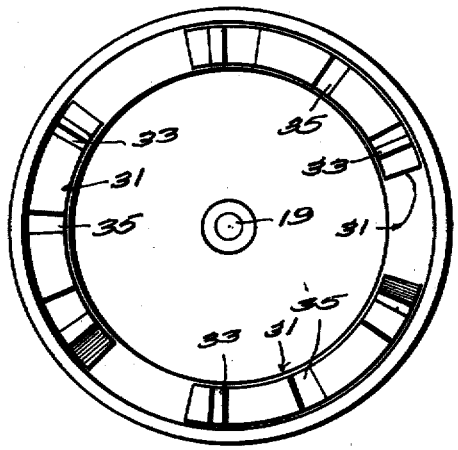
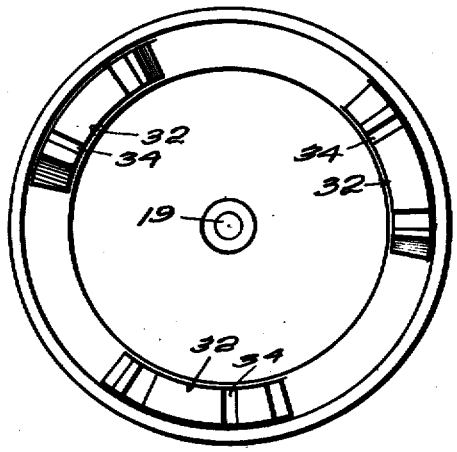
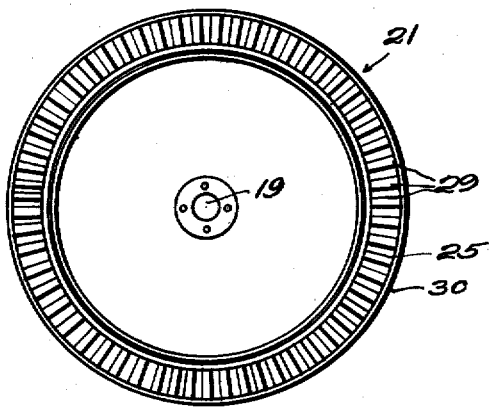
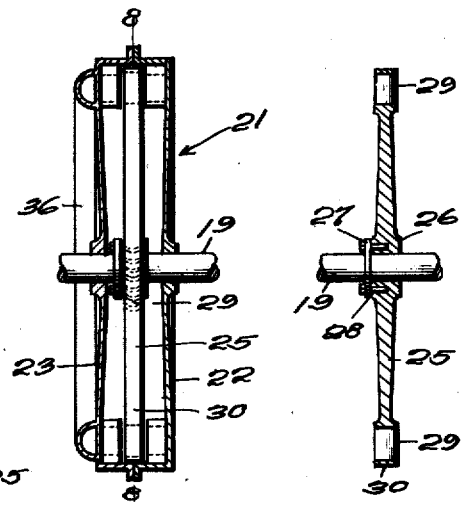
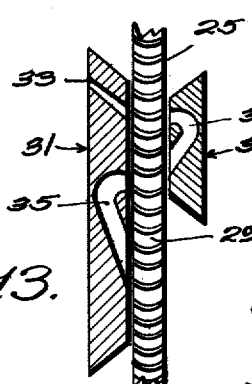

UNITED STATES PATENT OFFICE.

WILLIAM W. McELRATH, JR., OF EAST RADFORD, VIRGINIA, ASSIGNOR TO TURBO MOTOR COMPANY, OF TRENTON, NEW JERSEY, A CORPORATION OF NEW JERSEY.

INTERNAL-COMBUSTION ENGINE.

1,319,100.  Specification of Letters Patent.  Patented Oct. 21, 1919.

Application filed September 7, 1917. Serial No. 190,224.

*To all whom it may concern:*

Be it known that I, WILLIAM W. Mc-ELRATH, Jr., a citizen of the United States, and a resident of East Radford, in the county of Montgomery and State of Virginia, have invented new and useful Improvements in Internal-Combustion Engines, of which the following is a specification.

My invention relates to improvements in internal combustion engines, and has particular reference to such apparatus embodying a reciprocatory engine and a rotary engine or turbine, combined in a novel manner, for the production of a prime mover having the maximum degree of efficiency.

As is well known, the ordinary internal combustion engine of the reciprocatory type is not efficient in a big degree, as it only converts into useful energy about fifteen to twenty per cent. of the total amount of energy supplied thereto, by the ignition of the fuel. About thirty to thirty-eight per cent. of this energy remains in the heated exhaust gases, which are ordinarily exhausted to the atmosphere.

It is thus apparent that the efficiency of such an engine could be greatly increased, if the energy present in the exhaust gases could be utilized. Attempts have heretofore been made to utilize the energy contained in the exhaust gases of internal combustion engines, but such attempts have not proven satisfactory, owing to the fact that a certain degree of back pressure is developed in the exhaust pipe of the engine, thus preventing a proper scavenging of the products of combustion from the cylinders of the engine, and to the fact that back pressure is developed in the cylinders, at or about the time that a fresh charge of fuel should be drawn therein, whereby a proper intake of the fuel is prevented.

An important object of the invention is to provide a prime mover of the above mentioned character, which is adapted to employ a liquid or gaseous fuel, or a mixture thereof.

A further object of the invention is to provide a prime mover of the above mentioned character, which will operate with the maximum degree of silence.

A further object of the invention is to provide a prime mover of the above mentioned character, which is adapted to develop a maximum degree of horse power, is light, comparatively simple in construction, and has its parts arranged in a highly compact and convenient manner.

A further object of the invention is to provide a prime mover of the above mentioned character, which is extremely high in flexibility and acceleration, for the weight per horse power.

A further object of the invention is to provide a prime mover of the above mentioned character, which is particularly well adapted for use in connection with power units, which are operated under full load, such as in the aviation field, the sub-marine, motor-boat, generator sets, hydro-aeroplane, and the like.

Other objects and advantages of the invention will be apparent during the course of the following description.

Figure 2:
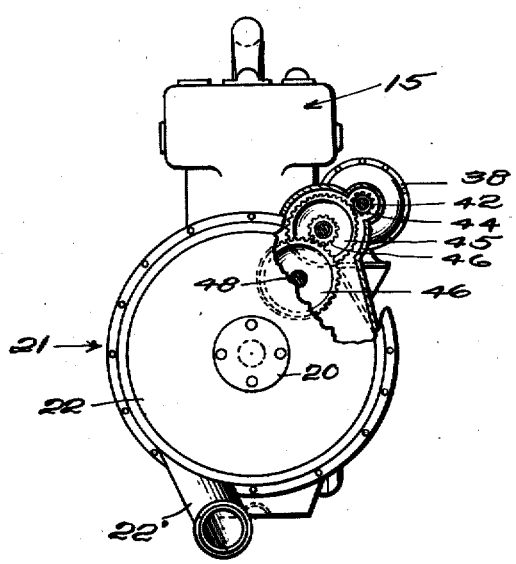
Figure 3:
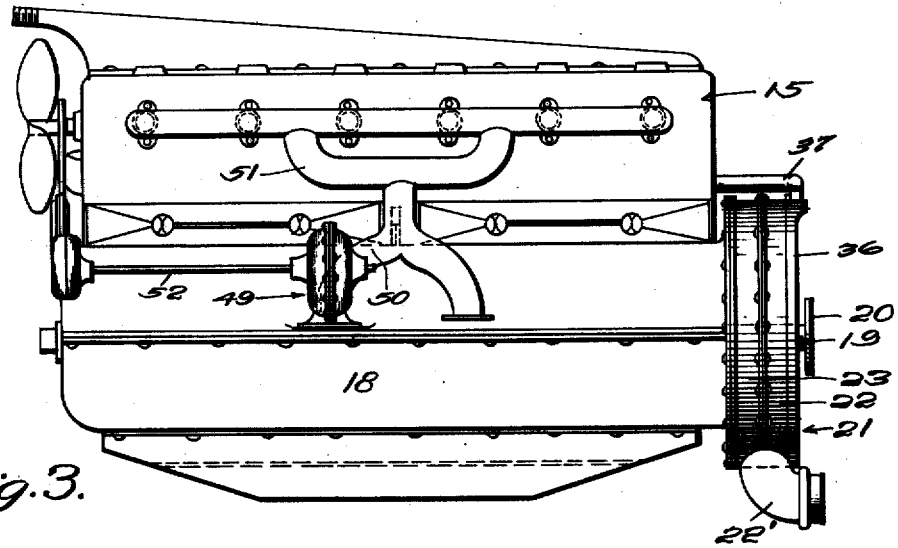
Figure 4:
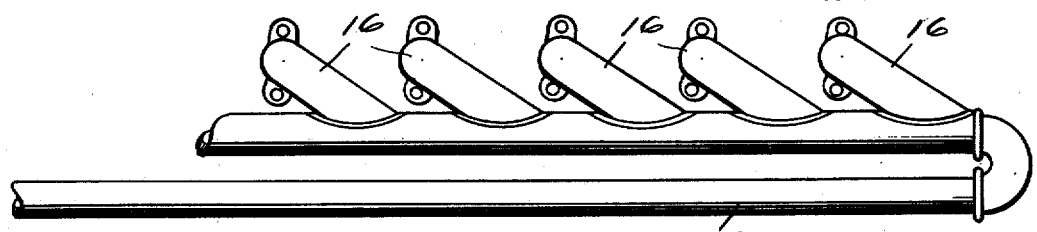
Figures 5, 6, 7:
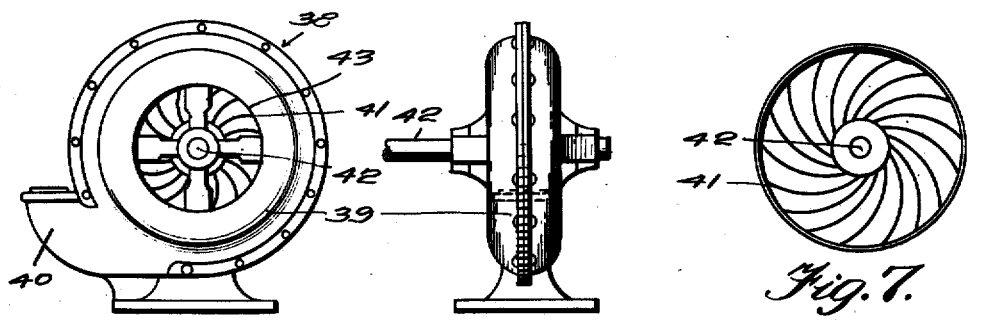

In the accompanying drawings, forming a part of this specification, and in which like numerals are employed to designate like parts throughout the same, Figure 1 is a side elevation of a prime mover embodying my invention, Fig. 2 is an end elevation of the same, Fig. 3 is a side elevation of a prime mover embodying a slightly different form of the invention, Fig. 4 is a plan view of an inertia pipe or conduit, Fig. 5 is a side elevation of a rotary blower or fan, Fig. 6 is an edge elevation of the same, Fig. 7 is a side elevation of the rotatable element of the fan or blower, Fig. 8 is a side elevation of parts of the turbine, as viewed from line 8—8 of Fig. 10, and looking to the left.

Fig. 9 is a similar view of the other portion or half of the turbine, viewed from line 8—8 of Fig. 10, and looking to the right, Fig. 10 is a transverse sectional view through the turbine, Fig. 11 is a side elevation of the wheel or rotor of the turbine, Fig. 12 is a transverse sectional view of Fig. 11, and Fig. 13 is an enlarged section, partly diagrammatic, showing the ports in the stationary blocks, and their relation to the vanes or blades of the wheel or rotor.

In the drawings, wherein for the purpose of illustration is shown a preferred embodiment of my invention, the numeral 15 designates a cylinder casting or block, or an internal combustion engine having six cylinders, while this number may be varied, if desired. In the forms of engines shown in Figs. 1, 2, 3 and 4, there are six exhaust pipes 16, which lead into the cylinders, and are connected with one branch of an approximately U-shaped inertia pipe 17. Attention is called to the fact that the exhaust pipes 16 are angularly arranged and extend in the direction of travel of exhaust as in the inertia pipe.

The engine is provided with a crank case 18, within which is disposed the usual crank shaft 19, carrying a disk 20, for coöperation with clutch mechanism, (not shown) whereby the rotation of the crank shaft may be imparted to the apparatus to be driven.

Arranged at the rear end of the crank case 18 is a turbine 21, comprising casing sections 22 and 23, which are rigidly secured together at 24. The casing section 23 may be rigidly secured to the crank case 18, by any suitable means. This turbine comprises a rotatable wheel or rotor 25, shown more clearly in Figs. 10, 11, 12 and 13. The rotor 25 has a hub 26, arranged upon the crank shaft 19. This crank shaft has a flange 27 rigidly secured thereto, and attached to the rotor 25 by bolts 28. The rotor 25 is provided at its periphery with a plurality of concavo-convex blades 29, inclosed in a ring 30. The rotor is arranged within the turbine casing and is disposed to operate between a plurality of spaced block-sections 31 and 32. The block sections 31 are held stationary within the casing section 22, at a point near its periphery, and the block-sections 32 are held stationary within the casing section 22, at a point near its periphery. The block-sections 31 and 32 are thus arranged in oppositely disposed pairs, upon opposite sides of the rotor 25. Each block-section 31 is provided with an inlet port 33, passing through the inner and outer faces thereof, and angularly arranged, to properly discharge the gas to or between the blades 29. Each block-section 32 is provided with an approximately U-shaped reverse port 34, passing through the inner face of the block-section alone, and adapted for the reception of the exhaust of gas from the blades 29, which gas has been supplied thereto from the inlet port 33. The reverse port 34 has its outlet end arranged to discharge gas to or between the blades 29, and this gas discharges from the blades into the intake end of a reverse port 35, formed in the block-section 31. The outlet end of this reverse port discharges the gas to or between the blades 29, and this gas passes into the turbine casing, and through the exhaust thereof to be described. It is thus apparent that the exhaust gases, while passing through these ports, will be expanded to reduce their pressure. The velocity of the gases serves to drive the rotor. The turbine casing has an exhaust pipe 22', which leads into the same between the block-sections.

As more clearly shown in Figs. 1, 3 and 10, the casing section 22 is provided with an annular inlet conduit 36, which has communication with the ports 33. One branch of the inertia pipe 17 is connected with and leads into the annular inlet conduit 36, as shown at 37. It is thus apparent that the exhaust from the cylinders will be supplied to the conduit 36 and then to the interior of the turbine.

The function of the inertia pipe 17 is to provide means whereby the exhaust gases will travel therein at a high velocity, and this travel of the exhaust through the same will create a high degree of suction within the exhaust pipes 16, whereby the cylinders of the engine will be completely scavenged prior to the inlet of the fresh charge of fuel thereto. It is thus apparent that the introduction of the fuel into the cylinders will be materially aided.

In the form of the engine shown in Fig. 1, I provide a rotatable fan or blower 38. (See Figs. 5, 6 and 7). This blower comprises a casing 39, having an outlet 40, which in Fig. 1 is connected with the upper or short arm of the inertia pipe 17. Arranged within the casing 39 is a rotatable fan 41, carried by a shaft 42. This fan is adapted to draw in air through openings 43, and discharge the same through the outlet 40.

The shaft 42 is driven by a small gear 44, engaged and driven by a large gear 45, receiving its rotation from a small gear 46. This small gear is driven by a large gear 47, carried by the cam shaft 48 of the engine, to be driven thereby. It is thus apparent that speed increasing gearing is employed to connect the shaft 42 with the cam shaft 48. Other suitable means may be employed to drive the blower.

In Fig. 3, the blower 38 is omitted, and the end of the upper arm of the inertia pipe 17 is closed. In this form of engine I employ a blower 49, similar to the blower 38. The outlet pipe 50 of this blower is connected with the intake manifold 51 of the engine between the carbureter and engine, and thus serves to accelerate the introduction of the fresh charge into the cylinders of the engine. The blower 49 has a rotatable fan which is driven by a shaft 52, in turn driven by suitable gearing serving to connect the shaft with the cam shaft or other movable part of the engine.

The operation of the apparatus is as follows:

The exhaust from the cylinders of the engine passes into the long inertia pipe 17 and travels therein at a high velocity, whereby it creates a suction in the exhaust pipes 16, at or after the intake stroke of the cylinders has begun, thereby thoroughly scavenging the same. The fan or blower 38 discharging into the intake end of the inertia pipe increases the high velocity of the exhaust therein.

In Fig. 3, the fan or blower 49 is connected with the intake manifold of the engine, between it and the carbureter. As soon as the intake valves of the cylinders open, this blower will force the fresh charge into the same.

The exhaust passes through the inertia pipe 17 and enters the annular supply conduit 36 of the turbine. This exhaust then passes through the inlet ports 33, and between the blades 29 of the rotor. The gas then passes through the ports 34, between the blades 29, the ports 35, between the blades 29, and into the turbine casing, for discharge through its exhaust. It is thus apparent that the exhaust will serve to drive the rotor. During this operation, the exhaust is expanded whereby its pressure is reduced, and back pressure avoided. When the exhaust discharges to the atmosphere through the turbine exhaust it is found to be below or at atmospheric pressure.

It is to be understood that the forms of my invention herewith shown and described are to be taken as preferred examples of the same, and that various changes in the shape, size, and arrangement of parts, may be resorted to, without departing from the spirit of my invention, or the scope of the subjoined claims.

Having thus described my invention, I claim:

1. A combined reciprocating rotary explosive engine comprising power cylinders having exhaust ports and pistons, a crank shaft operatively connected to said pistons, a rotor motor wheel mounted on said shaft, an inertia pipe for conveying exhaust gas to said wheel, exhaust pipes connecting the exhaust ports of said cylinders with said inertia pipe, the exhaust pipes being angularly disposed with respect to the inertia pipe and extending in the direction of travel therein whereby a partial vacuum is produced within said cylinders by the inertia of exhaust gases passing through said exhaust pipe, and means for injecting fluid under pressure into the end of said inertia pipe in the direction of the flow of the exhaust gases therethrough to facilitate the removal of spent gases from said exhaust pipes.

2. A combined reciprocating rotary explosive engine comprising power cylinders having exhaust ports and pistons, a crank shaft operatively connected to said pistons, a sectional casing, a rotor motor wheel mounted on said shaft and arranged between the sections of said casing, an annular inlet conduit carried by said casing and having communication with the interior thereof, an inertia pipe for conveying exhaust gases to said conduit whereby said gases are directed upon said rotor motor wheel, exhaust pipes connecting the exhaust ports of said cylinders with said inertia pipe, the exhaust pipes being angularly disposed with respect to the inertia pipe and extending in the direction of travel therein whereby a partial vacuum is produced within said cylinders by the inertia of exhaust gases passing through said exhaust pipe, and means for injecting fluid under pressure into the end of said inertia pipe in the direction of the flow of the exhaust gases therethrough to facilitate the removal of spent gases from said exhaust pipes.

3. A combined reciprocating rotary explosive engine comprising power cylinders having exhaust ports and pistons, a crank shaft operatively connected to said pistons, a sectional casing, a rotor motor wheel mounted on said shaft and arranged between the sections of said casing, an annular inlet conduit carried by said casing and having communication with the interior thereof, an inertia pipe for conveying exhaust gases to said conduit whereby said gases are directed upon said rotor motor wheel, exhaust pipes connecting the exhaust ports of said cylinders with said inertia pipe, the exhaust pipes being angularly disposed with respect to the inertia pipe and extending in the direction of travel therein whereby a partial vacuum is produced within said cylinders by the inertia of exhaust gases passing through said exhaust pipe, and a blower connected to the end of said inertia pipe for injecting air currents into the inertia pipe in the direction of the flow of exhaust gases therethrough to facilitate the removal of spent gases from said exhaust pipes, said blower being operatively connected with the crank shaft of the engine.

WILLIAM W. McELRATH, Jr.